United States Patent [19]

Kitada

[11] Patent Number: 4,638,779
[45] Date of Patent: Jan. 27, 1987

[54] APPARATUS FOR CONTROLLING AN ENGINE IN A HYDRAULICALLY DRIVEN VEHICLE

[75] Inventor: Tomowo Kitada, Komatsu, Japan

[73] Assignee: Kabushiki Kaisha Komatsu Seisakusho, Tokyo, Japan

[21] Appl. No.: 717,070

[22] Filed: Mar. 28, 1985

[30] Foreign Application Priority Data

Mar. 30, 1984 [JP] Japan ................. 59-45113

[51] Int. Cl.$^4$ ........................... F02M 39/00
[52] U.S. Cl. ..................... 123/385; 123/386; 123/357; 414/699
[58] Field of Search ............ 123/385, 386, 387, 373, 123/372, 357–359; 414/699

[56] References Cited

U.S. PATENT DOCUMENTS

| | | | |
|---|---|---|---|
| 2,986,291 | 5/1961 | Schick | 414/699 |
| 3,148,790 | 9/1964 | Ziskal | 414/699 |
| 3,716,159 | 2/1973 | Papasideris | 414/699 |
| 3,934,742 | 1/1976 | Tennis | 414/699 |
| 3,982,508 | 9/1976 | Norlin et al. | 123/385 |
| 4,262,642 | 4/1981 | Sverdlin | 123/385 |
| 4,369,625 | 1/1983 | Izumi | 414/699 |
| 4,373,850 | 2/1983 | Kitada | 123/386 |

FOREIGN PATENT DOCUMENTS 48-24323 7/1973 Japan ................. 123/385

Primary Examiner—Carl Stuart Miller
Attorney, Agent, or Firm—Armstrong, Nikaido, Marmelstein & Kubovcik

[57] ABSTRACT

An apparatus for controlling the engine of a hydraulically driven vehicle includes a transmission mechanism having a loose spring and connecting a fuel control lever operationally to a governor control lever, a decelerator cylinder including a spring having a slightly larger spring force than the loose spring and disposed on the opposite side of a piston from a hydraulic fluid chamber and a piston rod connected to the transmission mechanism by a yoke having a slot, an electromagnetic valve for supplying a hydraulic fluid from a hydraulic pump driven by the engine to the hydraulic fluid chamber in the decelerator cylinder or interrupting its supply, and an electric circuit for opening or closing the electromagnetic valve. As long as no hydraulic pressure acts on the piston, the spring in the decelerator cylinder maintains the governor control lever in its deceleration position even if the fuel control lever is turned to its full engine speed position, while the operation of the fuel control lever is transmitted directly to the governor control lever if a hydraulic pressure acts on the piston.

1 Claim, 6 Drawing Figures

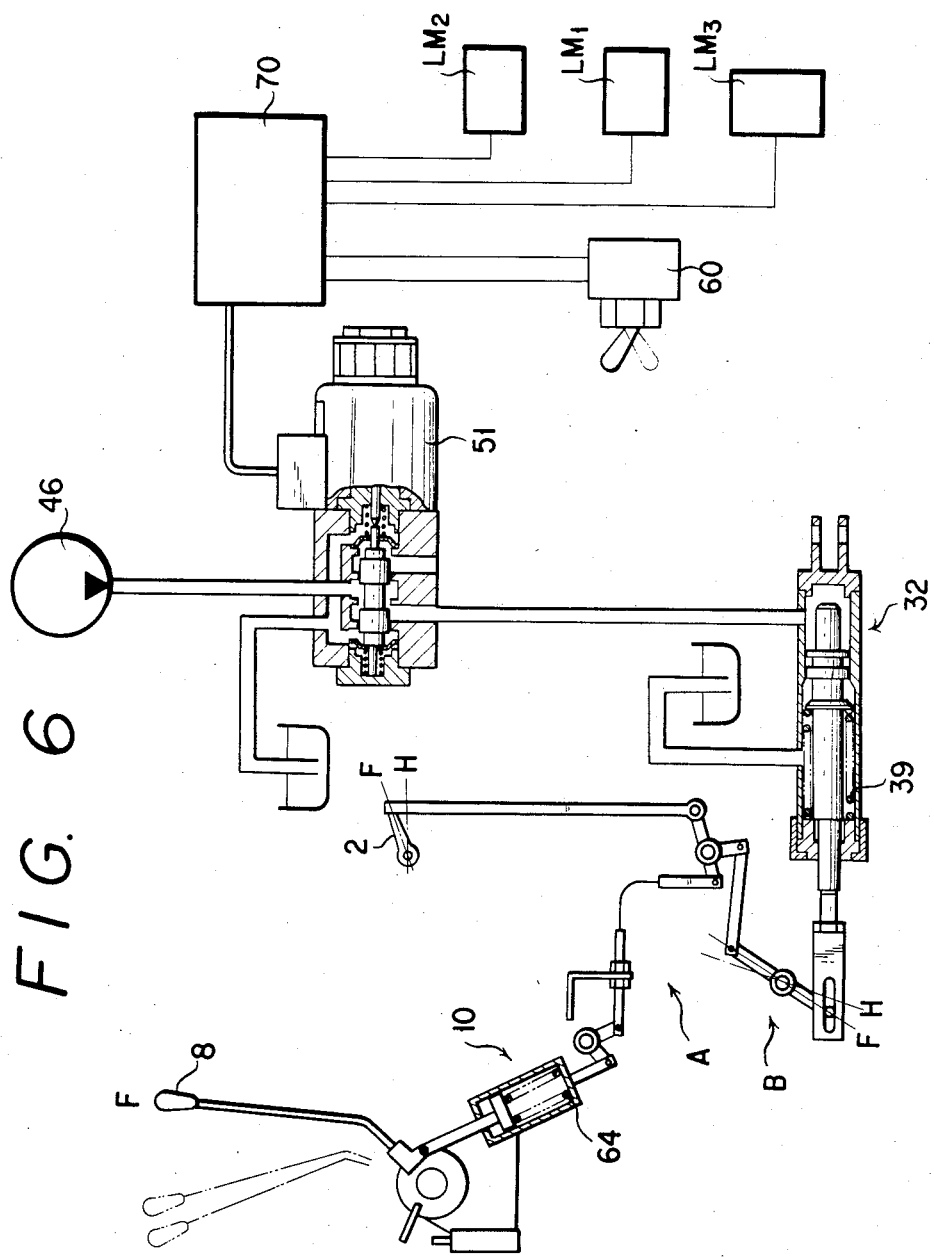

APPARATUS FOR CONTROLLING AN ENGINE IN A HYDRAULICALLY DRIVEN VEHICLE

BACKGROUND OF THE INVENTION

1. Field of the Invention

This invention relates to an apparatus of improved operability for controlling an engine in a hydraulically driven vehicle.

2. Description of the Prior Art

It has been a drawback of a conventional hydraulically driven vehicle, such as a power shovel, that the rotating speed of an engine set by a fuel control lever is maintained even when the vehicle is not working, resulting in a waste of fuel.

In order to improve this drawback, the applicant has proposed in Japanese Utility Model Application Provisional Publication No. 58-156138 an apparatus for controlling the engine of a hydraulically driven vehicle, including a pair of hydraulic pumps b and d driven by the engine a for supplying a hydraulic pressure to a travel circuit and a work circuit, respectively and a fuel control lever e which actuates a control lever f for a governor c to thereby set the rotating speed of the engine a, and characterized in that the governor control lever f is provided with a drive cylinder g which holds the governor control lever f in an engine idling (or low speed) position when the hydraulic pumps b and d are not under load, and drives it into a full engine speed position when those pumps are loaded. This apparatus is shown in FIG. 1.

As this apparatus relies upon the output pressure of the hydraulic pumps b and d for urging the governor control lever f toward its full engine speed position, however, an undesirable low speed rotation (or idling) of the engine is likely to result from a variation in the hydraulic pressure available. When a work machine is lowered, for example, it is impossible to obtain a sufficiently high hydraulic pressure, as the machine tends to come down by its own weight. The same problem occurs when a swing structure rotates by inertia. Thus, a reduction in the pressure rotating the governor control lever f toward its full engine speed position allows a spring force to urge the lever f toward its idling position and thereby lower the rotating speed of the engine.

Moreover, if all of the control levers are brought to their neutral positions, the resulting absence of the pressure urging the governor control lever f toward its full engine speed position brings about an immediate reduction in the rotating speed of the engine. This gives rise to a time lag in operation for any subsequent work and a lowering in control performance. It is necessary but undesirable from the standpoint of a noise to raise the engine speed repeatedly.

SUMMARY OF THE INVENTION

It is an object of this invention to provide an apparatus for controlling the engine of a hydraulically driven vehicle which includes a separate governor control pump instead of relying upon a pressure fluid from a hydraulic pump for a work machine so that no hydraulic force fluctuation due to the operation of the work machine may have any effect on governor control, and which also includes an electromagnetic changeover valve responsive electrically to the position of a work machine operating lever to control a pressure fluid from the governor control pump to actuate a deceleration cylinder to effect the automatic control of the governor between its full engine speed position and its idling position.

It is another object of this invention to provide an engine control apparatus for a hydraulically driven vehicle which brings a governor control lever to its full engine speed position for several seconds after all operating levers have been brought to their neutral positions.

In order to attain these objects, there is provided in accordance with this invention an apparatus for controlling the engine of a hydraulically driven vehicle comprising a transmission mechanism adapted to transmit the operation of a fuel control lever to a governor control lever and having a loose spring mechanism, a decelerator cylinder connected to the transmission mechanism and including a spring having a slightly larger spring force than a loose spring in the loose spring mechanism and adapted to manifest a force absorbing action in the absence of any hydraulic force acting on a piston to set the governor control lever in its deceleration position when the fuel control lever is moved to its full engine speed position, while the force absorbing action is overcome in the presence of a load acting on the piston to allow the loose spring to move the governor control lever to its full engine speed position, an electromagnetic valve adapted to effect the supply of a fluid from a control pump driven by the engine to a pressure chamber on the head side of the decelerator cylinder and interrupt it, and an electric circuit including a plurality of switches operationally associated with levers for operating a swing operation valve, a work machine operation valve and a traveling operation valve, respectively, for switching the electromagnetic valve, while the electromagnetic valve is switched several seconds after the switches have been turned off when the operating levers are all in their neutral positions.

These and other objects, features and advantages of this invention will become apparent to anybody of ordinary skill in the art from the following detailed description and the accompanying drawings in which preferred embodiments of this invention are shown by way of example.

BRIEF DESCRIPTION OF THE DRAWINGS

FIGS. 5 and 6 illustrate the operation of the apparatus of this invention.

DETAILED DESCRIPTION OF THE INVENTION

Figure 1:
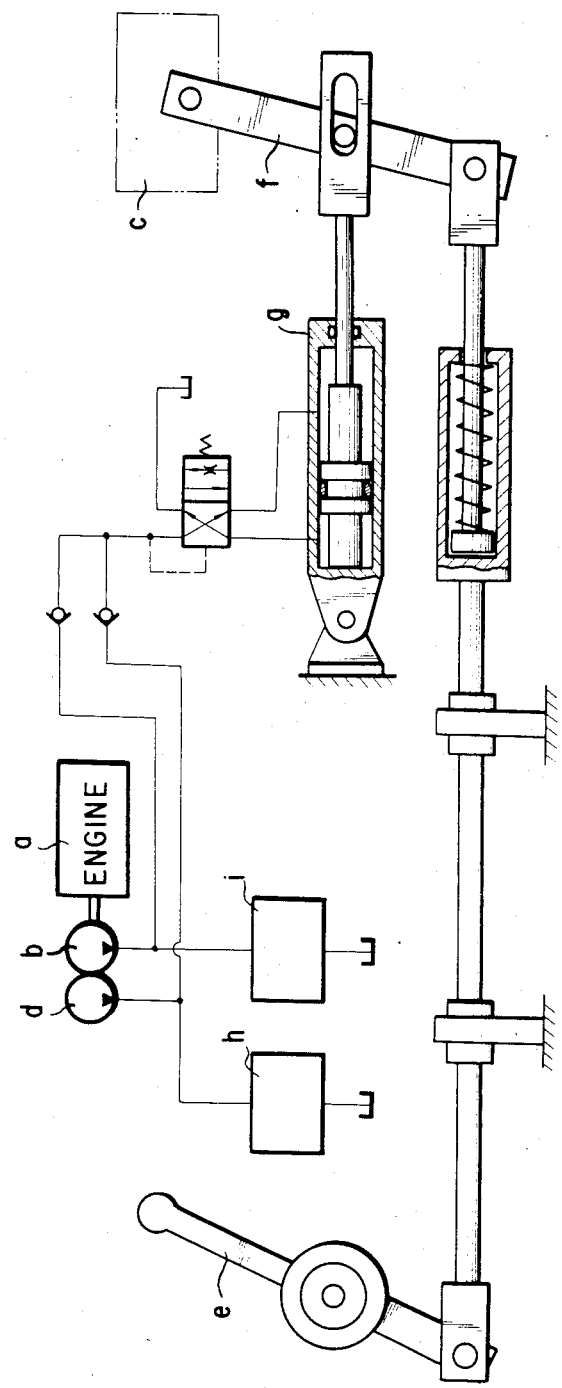
FIG. 1 is a schematic representation of a known engine control apparatus for a hydraulically driven vehicle including a drive cylinder.
Figure 2:
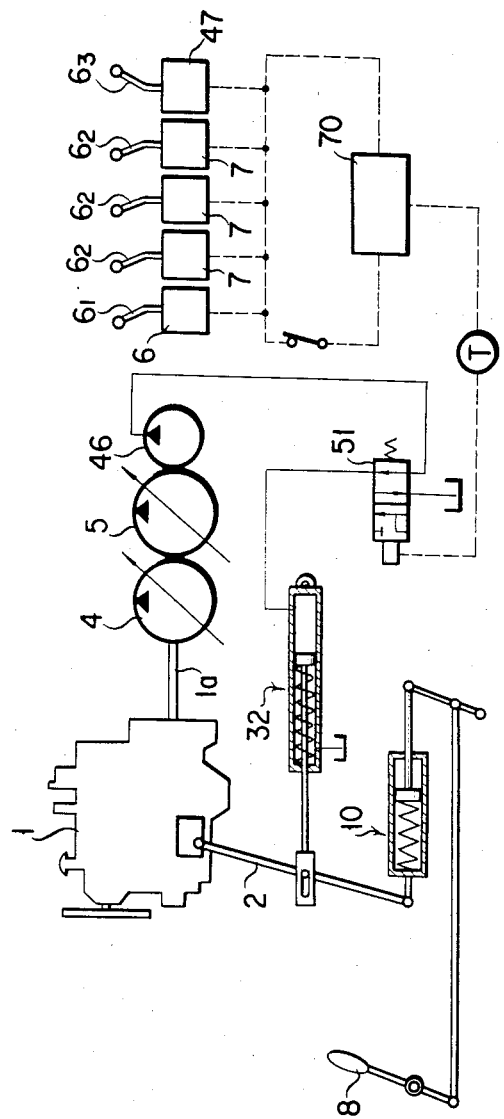
FIG. 2 is a schematic representation of an apparatus embodying this invention.
Figure 3:
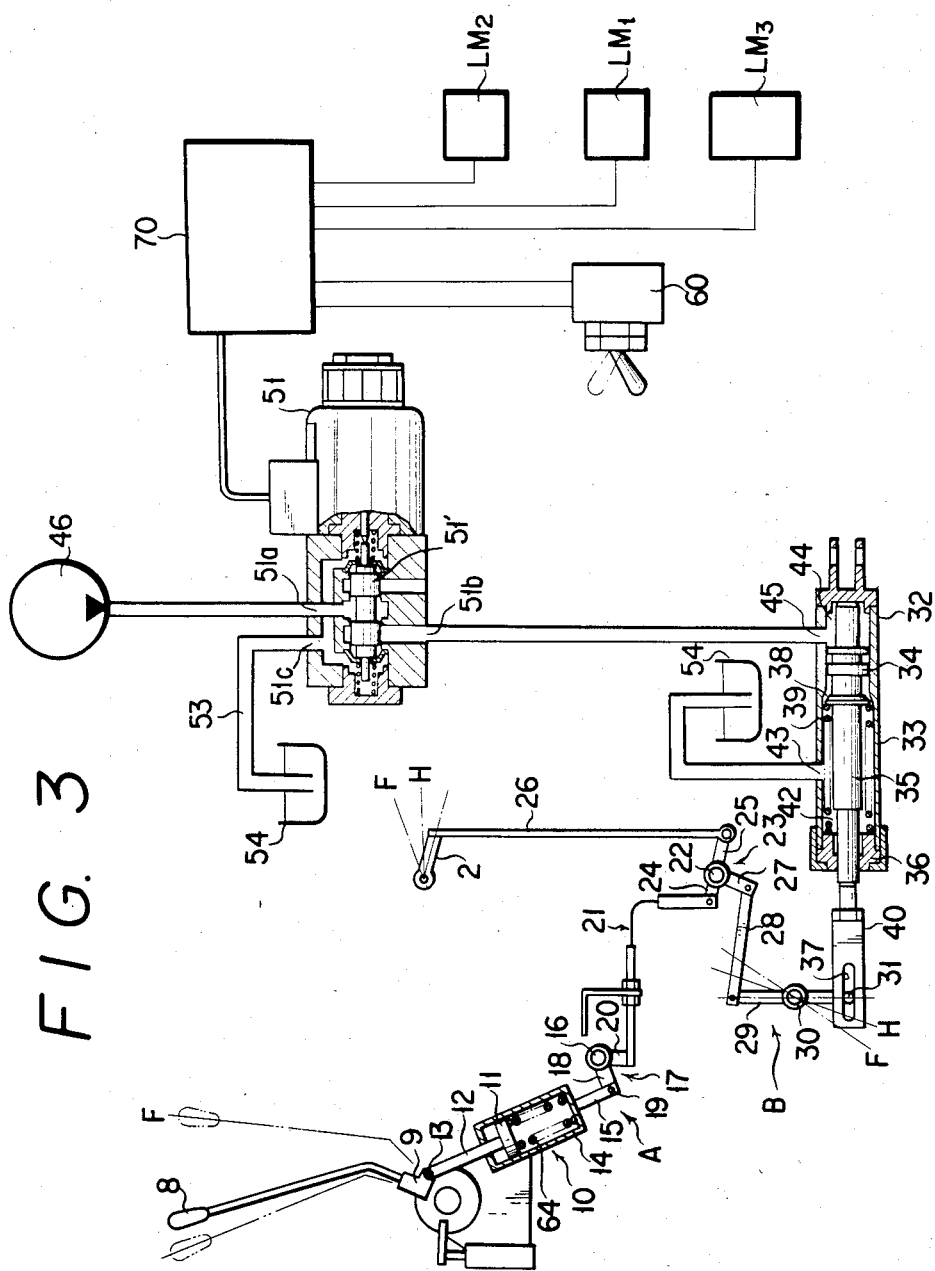
FIG. 3 is a schematic representation of the apparatus embodying this invention.

Preferred embodiments of this invention will now be described with reference to FIGS. 2 to 6. A governor control lever 2 is provided for an engine 1 mounted in a hydraulically driven vehicle not shown. The engine 1 has an output shaft 1a to which hydraulic pumps 4 and 5 and a control pump 46 are connected. A hydraulic pressure is supplied from the hydraulic pumps 4 and 5 to a circuit for controlling the swinging operation of the vehicle, a work machine control circuit for controlling the operation of an arm, boom or bucket and a circuit for controlling the travel of the vehicle, which are not shown, through the corresponding operating valves 6, 7 and 47, respectively.

A fuel control lever 8 has an arm 9 connected by a pin 13 to a rod 12 extending from a spring support 11 in a loose spring mechanism 10. The mechanism 10 has a spring housing 14 and a rod 15 having one end connected to the spring housing 14 is connected at the other end to a lever 17 having a pair of legs 18 and 20. The lever 17 is rotatable about a pivot 16 provided between the legs 18 and 20 and the other end of the rod 15 is connected to the leg 18 by a pin 19. The other leg 20 is connected to one end of a push-pull wire 21 and the other end of the wire 21 is connected to one leg 24 of a lever 23. The lever 23 has two other legs 25 and 27 and is rotatable about a pivot 22 provided at the junction of the three legs 24, 25 and 27. The governor control lever 2 is rotatably connected to the leg 25 by a connecting rod 26. The loose spring mechanism 10 and the levers 17 and 23 constitute a transmission mechanism A. An intermediate lever 29 has one end which is rotatably connected to the third leg 27 of the lever 23 by a link 28. The lever 29 is rotatable about a pivot 30 provided at its middle point and a pin 31 is provided at the other end of the lever 29. The intermediate lever 29 and the parts associated therewith constitute an intermediate connecting mechanism B.

A decelerator cylinder 32 has a cylindrical housing 33 in which a piston 34 is provided. A piston rod 35 connected to the piston 34 extends outwardly through a closure member 36 at one end of the housing 33 and has an outer end to which a yoke 40 is secured. The yoke 40 has a longitudinally extending slot 37. A spring support 38 is secured to the piston rod 35 in the housing 33 and a spring 39 is disposed between the closure member 36 and the spring support 38. The housing 33 defines therein a rod chamber 42 surrounding the piston rod 35 and a head chamber 44 located at the head of the cylinder on the opposite side of the piston 34 from the rod chamber 42. The housing 33 has a drain port 43 opening to the rod chamber 42 and a port 45 opening to the head chamber 44. The pin 31 provided on the intermediate lever 29 is fitted in the slot 37 of the yoke 40.

The control pump 46 has an outlet connected by a pipeline 50 to the inlet port 51a of an electromagnetic valve 51. The valve 51 has an outlet port 51b connected to the port 45 of the decelerator cylinder 32 by a pipeline 52 and a tank port 51c connected to a tank 54 by a pipeline 53. The drain port 43 of the decelerator cylinder 32 is connected to the tank 54.

Figure 4:
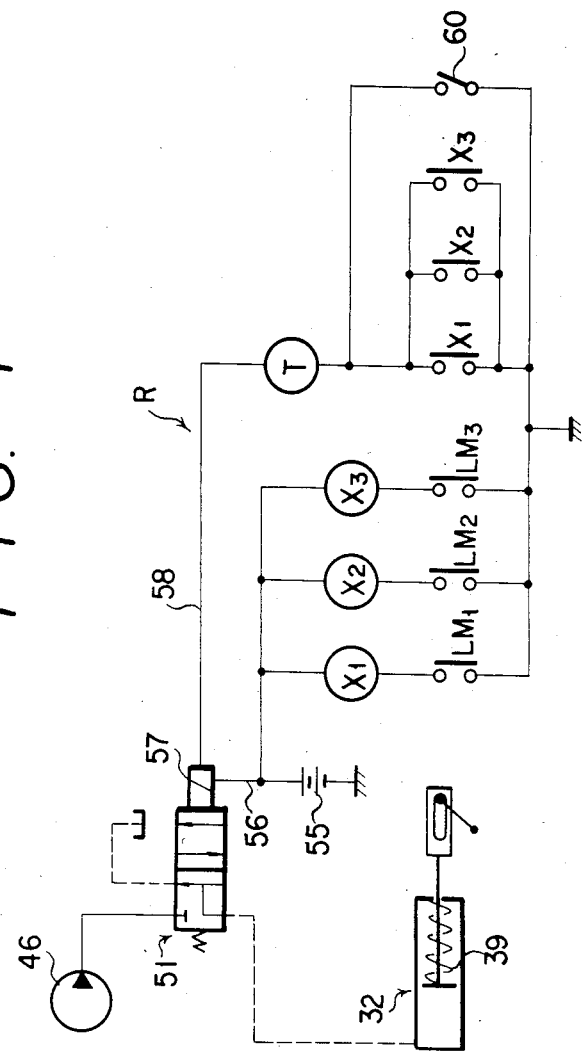
FIG. 4 is a diagram showing an electric circuit for an electromagnetic valve.
Figure 5:
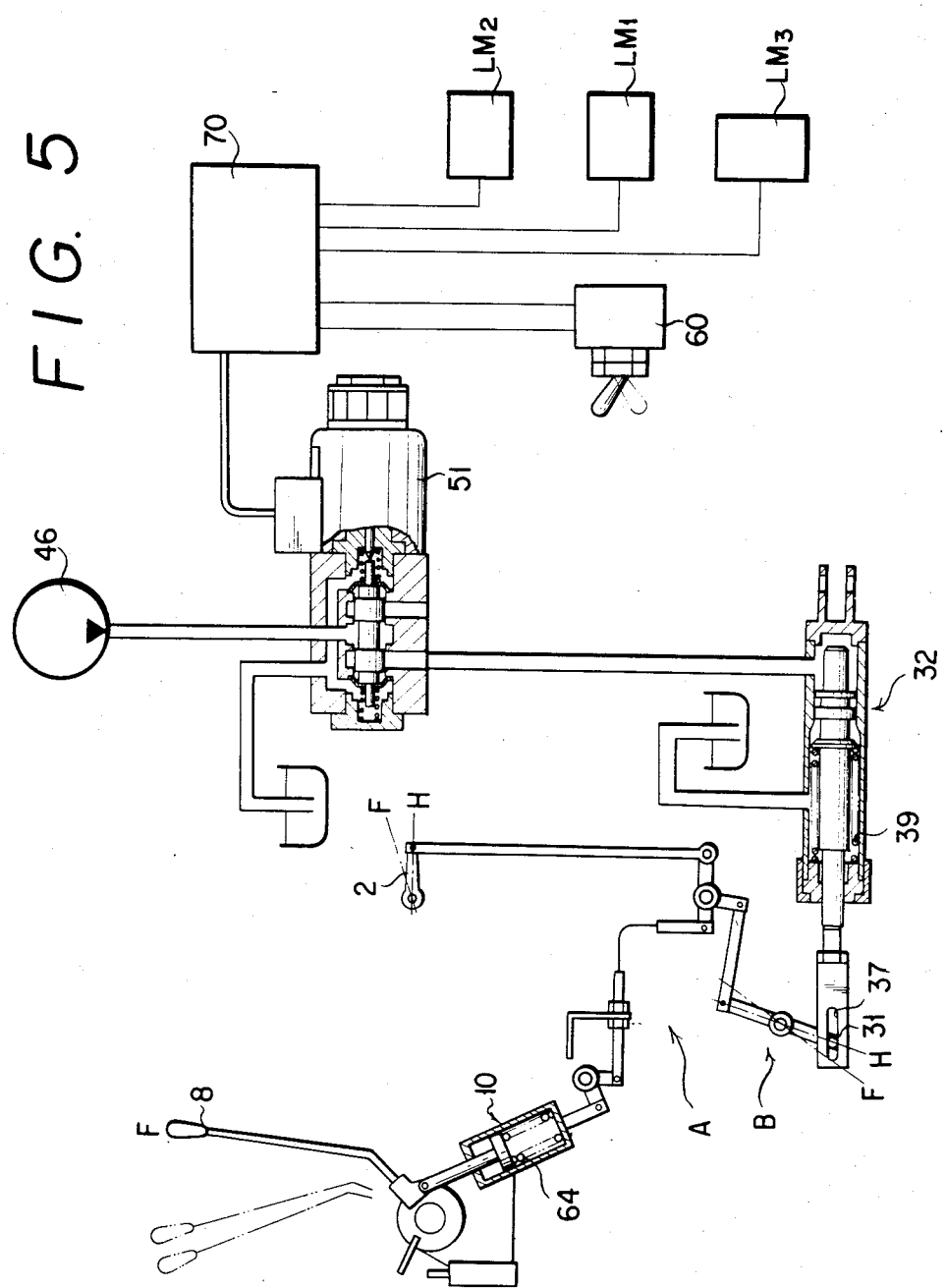

An electric circuit R for the electromagnetic valve 51 is shown in FIG. 4. A power source 55, which comprises a battery, has an anode connected by a leadwire 56 to one terminal of a solenoid 57 in the electromagnetic valve 51. The solenoid 57 has another terminal grounded by a leadwire 58 through a timer T and an automatic deceleration release switch 60. A relay $X_1$ and a hydraulic switch $LM_1$ which control the swinging operation are connected in series to the power source 55. A relay $X_2$ and a hydraulic switch $LM_2$ which control the operation of the arm, boom and bucket are connected in series to the power source 55. A relay ($X_3$) and a hydraulic switch $LM_3$ which control the travel of the vehicle are also connected in series to the power source 55. The normally open contacts $X_1$ to $X_3$ of the relays ($X_1$) to ($X_3$), respectively, are located in parallel to the automatic deceleration release switch 60 between the timer (T) and the ground.

The timer (T) is set for a period of several seconds, for example, about four seconds. Numeral 70, FIG. 5, denotes a switchboard. Operating levers $6_1$, $6_2$ and $6_3$ are provided for the operating valves 6, 7 and 47, respectively. The switches $LM_1$, $LM_2$ and $LM_3$ corresponding to the valves 6, 7 and 47, respectively, are turned off if the levers $6_1$, $6_2$ and $6_3$ are brought to their neutral position, and turned on if they are moved to any other position.

The spring 39 in the decelerator cylinder 32 has a slightly larger spring force than the spring 64 in the loose spring mechanism 10.

The operation of the apparatus will now be described for a number of cases.

(1) When the engine is rotating and the operating levers $6_1$ to $6_3$ are in their neutral positions, the rotation of the fuel control lever 8 to its full engine speed position F is transmitted by the transmission mechanism A and thereby tends to cause the governor control lever 2 to rotate to its full engine speed position F. As no hydraulic force yet acts on the piston 34 in the decelerator cylinder 32, however, the spring 39 in the decelerator cylinder 32, which has a slightly larger spring force than the loose spring 64, absorbs a part of the force acting on the loose spring 64 allows the governor control lever 2 to rotate only to its decelerating (half open) position H (see FIG. 5). This enables an improvement in fuel consumption.

(2) If the operating lever $6_1$, $6_2$ or $6_3$ is moved to its operating position when the engine is rotating and the fuel control lever 8 is in its full engine speed position F, the corresponding switch $LM_1$, $LM_2$ or $LM_3$ is closed. If the switch $LM_2$ controlling the operation of the work machine is, for example, closed, the corresponding relay ($X_2$) is actuated and its normally open contact $X_2$ is closed to allow an electric current to be supplied to the solenoid 57 to open the electromagnetic valve 51. A hydraulic fluid is, therefore, supplied from the control pump 46 to the head chamber 44 in the decelerator cylinder 32 to push the piston 34. The spring 39 in the cylinder 32 is thereby contracted and ceases to absorb a part of the force of the loose spring 64. The force of the loose spring 64 is transmitted by the transmission mechanism A to cause the governor control lever 2 to rotate to its full engine speed position F (see FIG. 6).

The governor control lever 2 is, thus, brought to its full engine speed position F automatically if the work machine is placed in operation. The work can, therefore, be started without presenting any problem, and without requiring any particular operation for increasing the engine speed.

(3) If all of the operating levers $6_1$ to $6_3$ are returned to their neutral positions when the engine is rotating, the switches $LM_1$ to $LM_3$ are opened and a spool 51' in the electromagnetic valve 51 is brought back to its closed position. The hydraulic fluid discharged by the control pump 46 flows into the tank 54 and does not flow into the head chamber 44 in the decelerator cylinder 32. The spring 39 causes the piston 34 to retract and the transmission mechanism A causes the governor control lever 2 to return to its decelerating position H (see FIG. 5). The fuel control lever 8 stays in its selected position despite the movement of the governor control lever 2.

If all of the operating levers $6_1$ to $6_3$ are returned to their neutral positions to open the switches $LM_1$ to LM₃ to trun off the relays (X₁) to (X₃) and open their normally open contacts X₁ to X₃, the governor control lever 2 returns to its decelerating position H about four seconds after the levers 6₁ to 6₃ have been returned to their neutral positions, since an electric current continues to be supplied to the solenoid 57 in the electromagnetic valve 51 for a further period of about four seconds for which the timer (T) is set, while the automatic deceleration release switch 60 is in its closed position.

The switchover of the operating valve 6, 7 or 47 from its working position to its neutral position and to its working position again is, therefore, carried out within about four seconds and the governor control lever 2 is maintained in its full engine speed position F when the valve 6, 7 or 47 has been turned to its neutral position.

As is obvious from the foregoing, the apparatus of this invention has a number of advantages as will hereinafter be summarized. Even if the fuel control lever 8 is rotated to its full engine speed position F when the engine is rotating, but when the operating levers are in their neutral positions, the electromagnetic valve 51 is not actuated, but the spring 39 in the decelerator cylinder 32 keeps the governor control lever 2 from rotating beyond its decelerating position H. This means an improvement in fuel consumption as compared with what is required conventionally for a vehicle in which the engine always rotates at full speed.

If the operating lever 6₁, 6₂ or 6₃ is turned to its operating position when the engine is rotating, the electromagnetic valve 51 is actuated to allow the supply of a hydraulic fluid to the head chamber 44 in the decelerator cylinder 32. The spring 39 ceases to absorb a part of the force of the loose spring 64 and the loose spring 64 causes the governor control lever 2 to rotate to its full engine speed position F. If the lever 6₁, 6₂ or 6₃ is turned from its operating position to its neutral position when the engine is rotating, the corresponding switch LM₁, LM₂ or LM₃ is turned off to return the spool in the electromagnetic valve 51 to its closed position and the spring 39 causes the governor control lever 2 to return to its decelerating position H. The apparatus of this invention improves the operating efficiency of the vehicle without presenting any problem in the swinging, working or traveling of the vehicle and without requiring any particular operation for increasing the engine speed.

Moreover, as the governor control lever 2 returns to its decelerating position H several seconds after the operating lever 6₁, 6₂ or 6₃ has been turned to its neutral position, the corresponding valve 6, 7 or 47 is switched from its working position to its neutral position within several seconds and the governor control lever 2 is maintained in its full engine speed position F when the valve 6, 7 or 47 has been brought to its neutral position. It is, therefore, possible to avoid any reduction in the rotating speed of the engine when the vehicle is swinging, working or traveling.

The use of the electromagnetic valve 51 ensures the reliable operation of the decelerator cylinder 32 and eliminates the costs of the hydraulic piping and the like which would otherwise be required.

What is claimed is:

1. An apparatus for controlling the internal combustion engine of a hydraulically driven vehicle comprising:

a transmission mechanism for transmitting the operation of a fuel control lever to a governor control lever and having a loose spring mechanism with a loose spring therein;

a hydraulic decelerator cylinder connected to said transmission mechanism and having a spring and piston therein, said deceleration cylinder spring having a slightly larger spring force than said loose spring in said loose spring mechanism and applying a force absorbing action, in the absence of hydraulic force acting on said piston, to set said governor control lever in its deceleration position when said fuel control lever is moved to its full engine speed position and for moving said governor control lever to its full engine speed position when hydraulic force is applied to said piston;

an electromagnetic valve for applying fluid pressure from a control pump driven by said engine to said piston in said decelerator cylinder and releasing said fluid pressure; and an electric circuit including a plurality of switches operationally associated with levers for operating a hydraulic valve for controlling the swinging of the vehicle, a hydraulic valve for controlling the operation of a work machine on the vehicle and a hydraulic valve for controlling the travel of the vehicle, respectively and for opening and closing said electromagnetic valve, said electric circuit including time delay means for delaying the operation of said electromagnetic valve several seconds after said switches have been turned off and said operating levers are all in their neutral positions.

* * * * *